Dec. 3, 1940. A. T. PRESCOTT Re. 21,650
TURN-OVER DOOR
Original Filed June 12, 1937 3 Sheets-Sheet 1
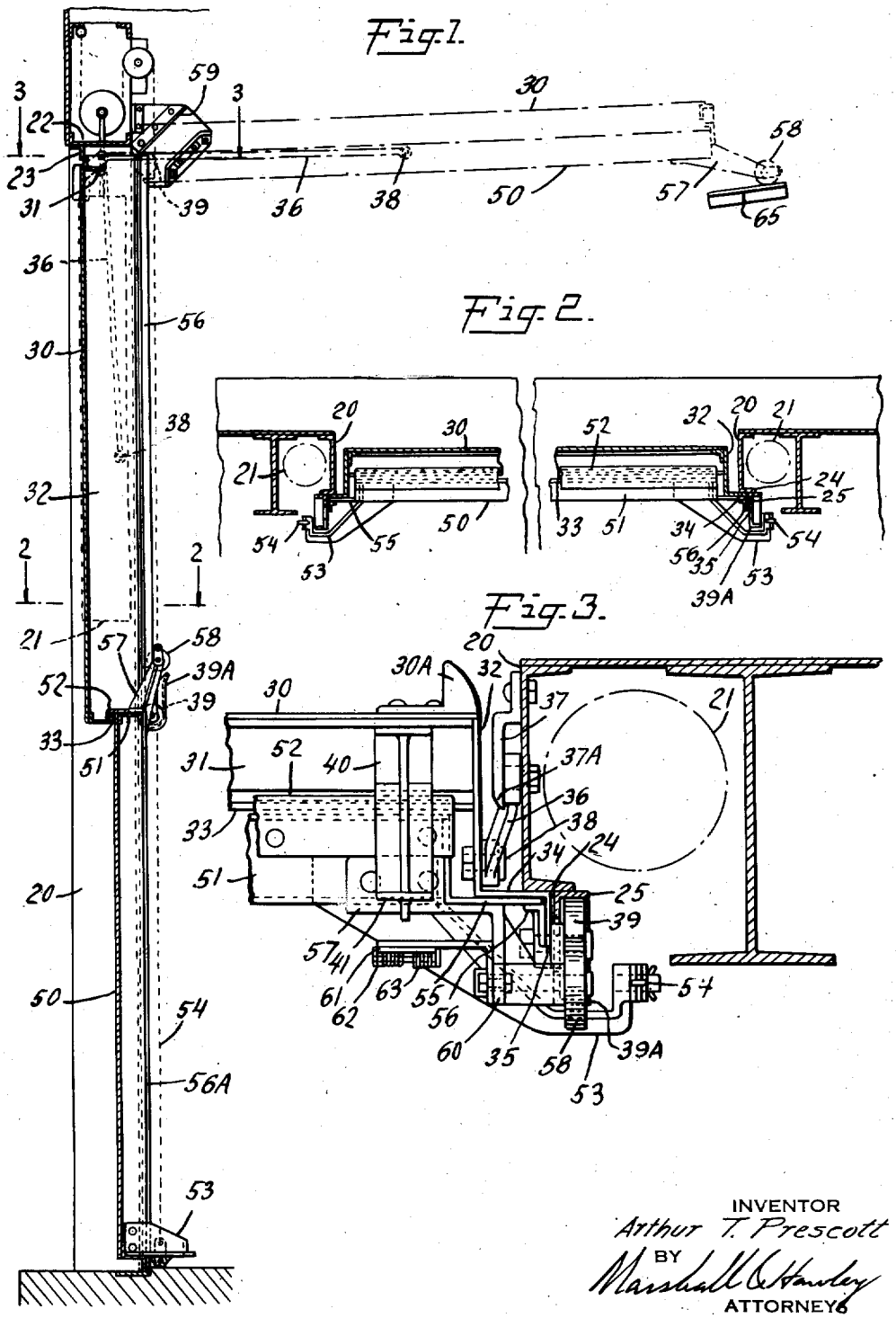
INVENTOR
Arthur T. Prescott
BY
Marshall & Hawley
ATTORNEYS Dec. 3, 1940. A. T. PRESCOTT Re. 21,650

TURN-OVER DOOR

Original Filed June 12, 1937 3 Sheets-Sheet 2

INVENTOR
Arthur T. Prescott
BY
Marshall & Hanley
ATTORNEYS

TURN-OVER DOOR

Original Filed June 12, 1937 3 Sheets-Sheet 3

INVENTOR
Arthur T. Prescott
BY
Marshall & Stanley
ATTORNEYS

Reissued Dec. 3, 1940 Re. 21,650

UNITED STATES PATENT OFFICE 21,650

TURN-OVER DOOR

Arthur T. Prescott, East Orange, N. J., assignor to J. Edward Ogden Company, East Orange, N. J., a corporation of New Jersey Original No. 2,187,363, dated January 16, 1940, Serial No. 147,880, June 12, 1937. Application for reissue August 10, 1940, Serial No. 352,175

13 Claims. (Cl. 20—19)

This invention relates to improvements in turn-over doors, and especially to sectional doors of the type which are used for industrial purposes, which usually are of large size.

Its object is to improve upon doors of this character by constructing them in such a manner that they occupy less useful space than heretofore has been thought possible.

Doors are available which are divided horizontally into sections, the upper section abutting against the jambs and the lower section sliding over it in a plane still farther inside of the building structure to open the lower part of the door-way and then the sections swinging inwardly to a substantially horizontal position near the level of the lintel.

One of the advantages of doors of this type is the conservation of space. Because of their large size and the wind pressures to which they are subjected, the panels have to be of considerable thickness. Consequently, the lower panel when closed occupies a position equal to at least its width and the combined thickness of the panels, and this space is wasted. The principal object of this invention is to overcome this difficulty and to provide a construction which makes it possible to position the door sections between the jambs, so that they occupy no useful space adjacent the door openings, which in large industrial or warehouse buildings is of considerable value. These doors are used principally on piers where the cargo is piled within two or three inches from the doors so that when the door sections are raised this cargo can be loaded directly onto a ship. The space saved by these doors is, therefore, the most valuable storage space on the pier.

To this end, my invention relates to a novel construction and arrangement of the supporting and actuating parts of a door structure which is illustrated in the accompanying drawings and which will be described in the following specification.

Referring to the drawings,

Fig. 1 is a sectional elevation of a door which is made according to and embodies this invention, with the open position of its sections indicated by broken lines;

Fig. 2 is a sectional plan view of the structure shown in Fig. 1, the section being taken on the line 2—2 of the latter figure;

Fig. 3 is a sectional plan view on a larger scale of some of the parts shown in Fig. 2;

Like characters of reference designate corresponding parts on each of the figures.

20 designates the door jambs. These are built up of structural steel in the usual manner and counterweights 21 for the door sections run within them, (Figs. 1, 2 and 3). 22 is the door lintel. 30 is the upper door section and 31 is an angle iron which runs across the top of this upper section and forms its upper edge. When the door is closed one of the legs of this angle iron abuts against a leg of another angle iron 23 affixed to the lintel.

Figure 6:
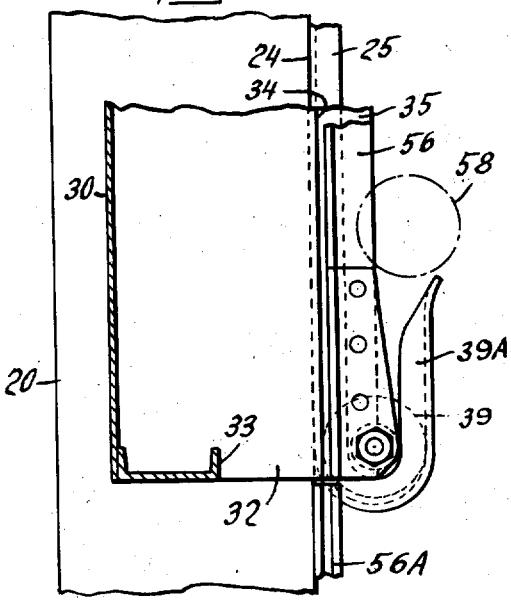
Fig. 6 is a sectional elevation of some of the parts showing in detail a device for holding the lower part of the upper section closed.
Figure 7:
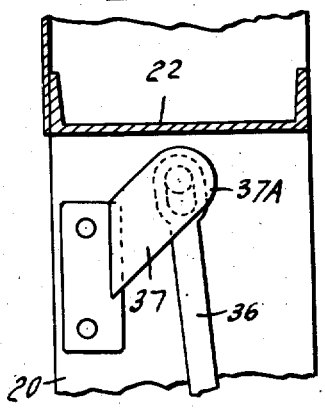
Fig. 7 is an elevation illustrating another structural detail—the support for the upper end of one of the links.

The vertical edges of the upper door sections comprise flat plates 32 which extend inwardly beyond the inner edge 33 of the upper section and are bent at right angles to form portions 34 which abut against surfaces 24 of the jamb when the door is closed, and thence inwardly to form portions 35 which fit within the flanges of angle irons 25 on the jamb. The edge 33 is formed by the inner web of a channel iron which forms the lower edge of the upper section. Rollers 39, which run on the other flanges of angle irons 25, are pivotally supported on these portions 35 of the sides of the upper section. As the upper section is lowered into its closed position, these rollers run into brackets 39A on the jambs, (Fig. 6) which hold the lower end of the upper section, and the upper end of the lower section, (which is engaged with the upper section, as will be pointed out) tightly closed.

The upper section is supported by links 36 which are supported by brackets 37 affixed to the jambs 20 by a pin and slot connection and to the plates 32 by pivots 38 intermediate the top and bottom of the upper section and located inside of the points of connection of the links with the brackets 37. This arrangement gives the upper section a tendency to swing outwardly and to bring its angle iron 31 into contact with the jamb angle iron 23 when the door is closed.

Figure 5:
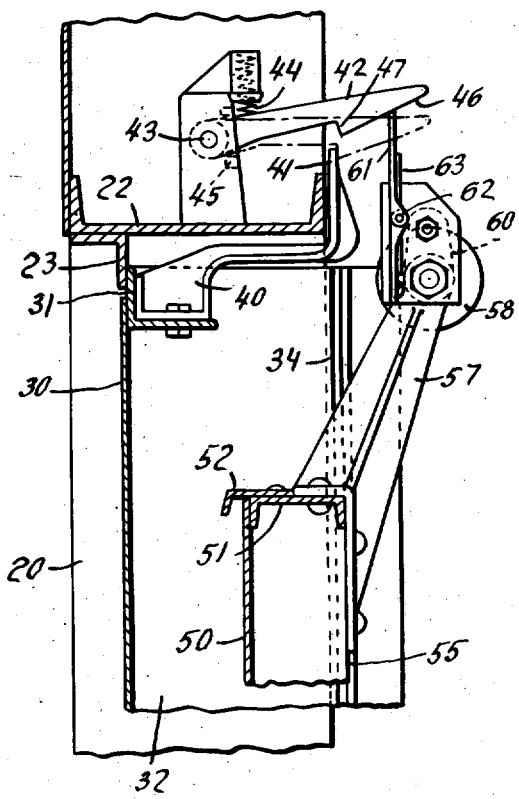
Fig. 5 is an elevation partly in section of a latch mechanism for holding the upper part of the upper section closed.

The upper edge of the upper section is maintained in this closed position by the latch mechanism which is illustrated in Fig. 5. Brackets 40 having flanges 41 extending upwardly inside of the lintel, are secured to opposite ends of the angle iron 31. These flanges are engaged by latches 42 pivoted at 43 at stationary points. The latches move to horizontal positions by gravity, assisted by springs 44 and their downward movement is limited by stops 45. As the door swings shut the flanges 41 ride over inclined projections 46 of the latches and raise them until the flanges pass the shoulders 47. Then the latches drop and hold the upper part of the upper section closed. The manner in which the latches are released will be described later.

The lower door section is designated by the reference numeral 50. Its upper edge is formed by an inverted channel iron 51, to which is secured an angle iron 52 which extends outwardly into position to overlap the inner edge 33 of the lower edge of the upper section when the door is closed, (see Fig. 1). At the lower corners of the lower section are brackets 53 to which the hoisting chains or cables 54 are attached. These run up to hoisting mechanism at the top of the door-way and to the counterweights 21. These parts are not described specifically as they are well known and form no part of the present invention.

Flat plates 55 extend outwardly from the vertical edges of the lower section and are arranged to slide up over the parts 34 of the upper section into grooves formed between these parts 34 and angle irons 56 secured to them.

Figure 4:
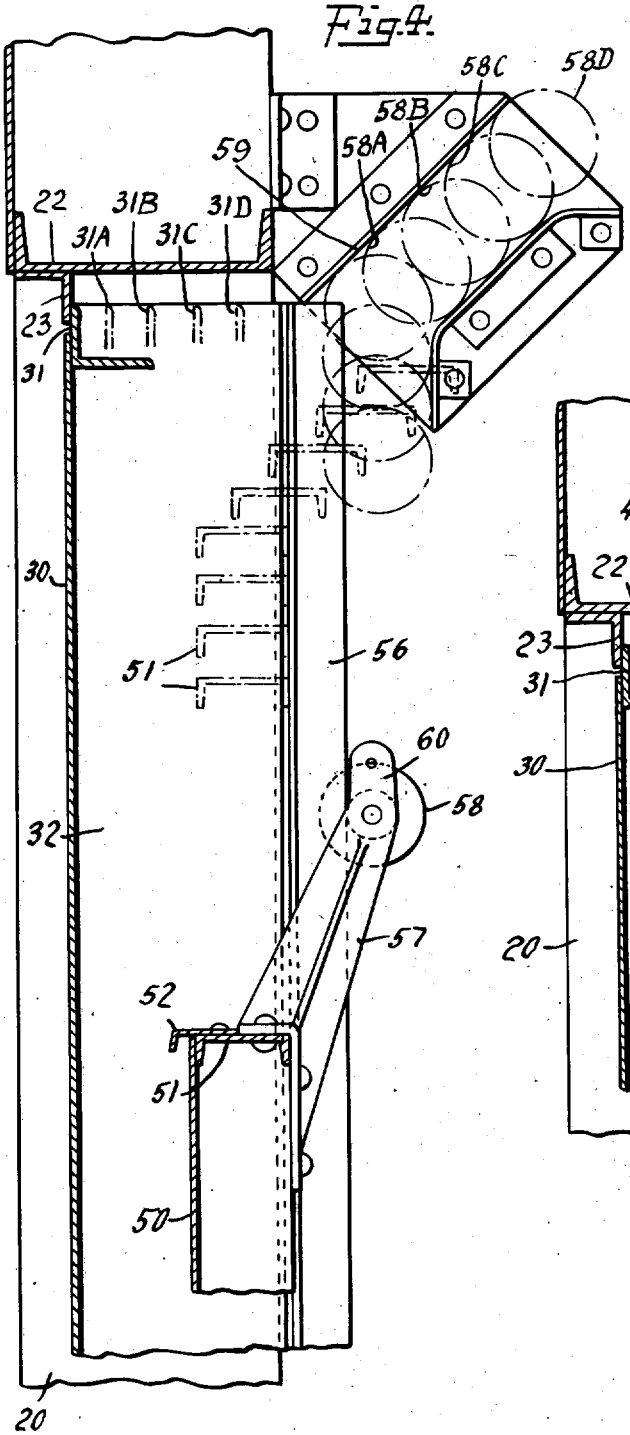
Fig. 4 is a sectional elevation on an enlarged scale of the upper part of the structure illustrating its operation.

Brackets 57 near the upper corners of the lower section carry rollers 58 which run through an inclined channel 59 when the door is opened and closed, (see Fig. 4).

Other brackets 60 on the upper edge of the lower section carry plates 61 in alinement with the latches 42. These plates are pivoted to the brackets at 62 and are pressed into vertical position by springs 63. When the door is opened and the lower section reaches the position indicated in Fig. 5, the plates 61 lift the latches and permit the upper edges of both sections to swing inwardly.

Before describing the modifications shown in Figs. 8–11, I will describe the operation of the apparatus. When the lower section is raised, its plates 55 slide in the groove between the portions 34 of plates 32 and the angle irons 56 on the upper section which guide it into overlying position. When it reaches the position shown in Fig. 5 the latches 42 are released and the upper edges of the sections are free to swing inwardly. As both sections are then under the lintel it is necessary to provide a mechanism to move them laterally. This is shown in Fig. 4.

The channel iron 51 rises vertically until rollers 58 reach the inclined channels 59. When these rollers are deflected to the position shown at 58A, the vertical web of angle iron 31 will be moved to the position indicated at 31A. Successive positions of rollers 58 and angle iron 31 are shown at 58B, 31B, 58C, 31C and 58D, 31D. At the latter position the angle iron 31 is in a position to clear the lintel and the door sections are free to be moved to the full open position shown in broken lines in Fig. 1. Then the rollers 58 rest on brackets 65.

In closing, the operation is reversed. As the upper door section approaches its closed position, rollers 39 on the bottom of this door section come into engagement with brackets 39A. Thereafter, or coincidentally, the upper edges of both door sections are forced outwardly by the engagement of roller 58 with channel 59 until angle iron 31 abuts angle iron 23, at which time latch 42 engages flange 41. During the closing operation plate 61 is free to swing inwardly to pass the latch. Continuance of the closing operation permits the lower door section 50 to pass downward into the grooved guides 56A attached to the jambs opposite this portion of the doorway. When the door is fully closed the upper end of plate 55 remains in engagement with the groove carried by the upper door section formed by members 34 and 56.

At the upper corners of the upper door section are lugs 30A having curved slanted faces which are adapted to contact with the link brackets 37 to centralize the door when closing.

Figure 8:
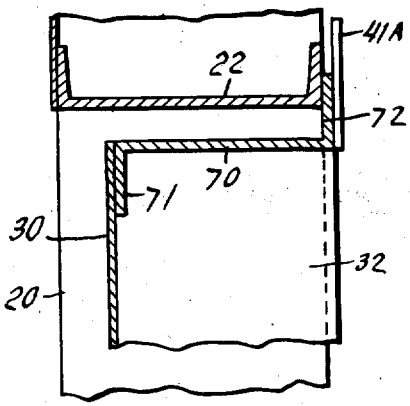
Fig. 8 is a sectional elevation of the lintel and a modified form of the upper edge of the upper section.

In Fig. 8 the top of the upper section 30 is formed of a plate 70 which has a downwardly projecting flange 71 at its outer edge and an upwardly projecting flange 72 at its inner edge adapted to abut against the inner surface of the lintel. Plates 41A are affixed to the flange 72 for engagement with the latches.

Figure 9:
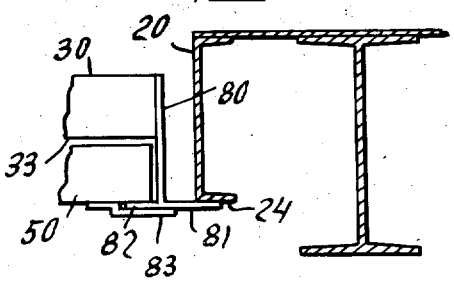
Figs. 9, 10 and 11 are sectional plan views of one of the jambs and of modifications of associated parts of upper and lower door sections.

Fig. 9 illustrates a modification of the interconnecting parts of the door sections and the jamb. 80 is a plate affixed to the vertical edge of the upper door section 30. A flange 81 at its inner edge overlaps the surface 24 of the jamb and another flange 82 fits a channel formed by the inner surface of the lower door section and an angular strip 83 affixed to the latter.

Figure 10:
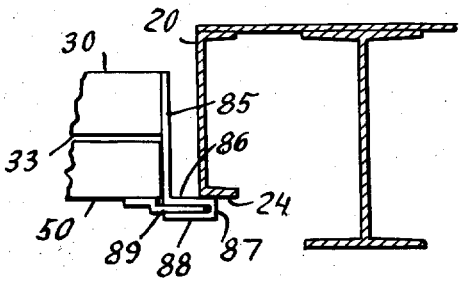

In Fig. 10 a plate 85 is bent outwardly to form a portion 86 which overlaps the jamb surface 24 and then inwardly at 87 and back again, as at 88, to form a channel which slidably receives a strip 89 affixed to the lower section.

Figure 11:
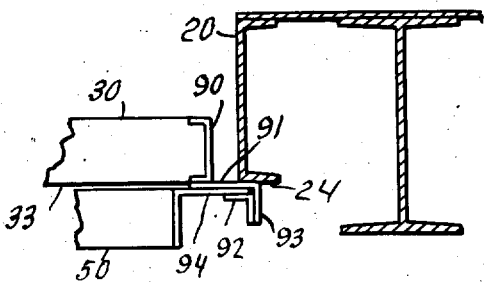

In Fig. 11, 90 is a channel iron which forms a vertical edge of the upper section. One web 91 of an angle iron is affixed to this channel iron. It extends outwardly to overlap the jamb surface 24. A channel is formed between this web 91 and an angle iron 92 which is affixed to the other web 93 of the first mentioned angle iron, to slidably receive a web 94 of an angle iron affixed to the vertical edge of the lower door section. Although this construction is quite simple it does not attain the full advantage of this invention as only the upper section is fully inset between the jambs.

I have illustrated and described the invention as applied to the link type turn-over doors, but it is obvious that it is equally applicable to other types of turn-over doors, such as those which are guided in tracks.

Several modifications have been illustrated and described to show that structural changes may be made within the spirit and scope of the invention, and I intend no limitations other than those imposed by the appended claims.

What I claim is:

1. A pair of door jambs and a lintel, an upper door section and a lower door section between and outside of the inner plane of the jambs, means for raising the lower door section vertically to overlie the upper section, means actuated by the movement of the lower door section as it approaches the upper end of its vertical travel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections and plates on the door sections overlapping the jambs when said sections are closed.

2. A pair of door jambs and a lintel, an upper door section and a lower door section between the jambs and outside of the inner plane of the jambs and the lintel, guides on the upper section to receive the lower section, means for raising the lower section in said guides to overlie the upper section, rollers near the upper edges of the lower section, inclined channels near the lintel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections and plates on the door sections overlapping the jambs.

3. A pair of door jambs and a lintel, a transverse flange depending from the lintel, an upper door section and a lower door section between the jambs and outside of the inner plane of the jambs and the lintel, plates on the edges of the upper section overlapping the inner surfaces of the jambs, a latch to maintain the upper edge of the upper section against the lintel flange, guides on the upper section to receive the lower section, means for raising the lower section in said guides to overlie the upper section, rollers near the upper edges of the lower section, inclined channels near the lintel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections, means on the lower section for releasing the latch, rollers near the lower edges of the upper section, and pockets on the jambs for receiving said rollers when the upper section is closed to hold its plates against the jambs.

4. A pair of door jambs and a lintel, an upper door section and a lower door section between and outside of the inner plane of the jambs, means for raising the lower door section vertically to overlie the upper section, means actuated by the movement of the lower door section as it approaches the upper end of its vertical travel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections, and lugs on the upper corners of the upper door section having slanted surfaces for guiding the side edges of the upper door section between the jambs in closing.

5. A pair of door jambs and a lintel, an upper door section and a lower door section between and outside of the inner plane of the jambs, means for raising the lower door section vertically to overlie the upper section, means actuated by the movement of the lower door section as it approaches the upper end of its vertical travel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections, and means for guiding the side edges of the upper door section between the jambs in closing.

6. A pair of door jambs and a lintel, an upper door section and a lower door section between and outside of the inner plane of the jambs, means for raising the lower door section vertically to overlie the upper section, means for causing both sections to swing inwardly to clear the inner plane of the lintel, and plates on at least one of the door sections overlapping the jambs when said sections are closed.

7. A pair of door jambs and a lintel, an upper door section and a lower door section between and outside of the inner plane of the jambs, means for raising the lower door section vertically to overlie the upper section, means for causing both sections to swing inwardly to clear the inner plane of the lintel, and means for guiding the side edges of the door sections between the jambs in closing.

8. A pair of door jambs, an upper door section between and outside of the inner plane of the jambs, plates on said upper section overlapping the inner surface of the jambs when said section is closed, a lower door section, guides on the upper section for receiving the lower section, means for raising the lower section in said guides to overlie the upper section, means for causing both sections to swing inwardly to fully open position, and means for guiding the side edges of the upper section between the jambs in closing.

9. A pair of door jambs and a lintel, an upper door section between and outside of the inner plane of the jambs and the lintel, plates on the side edges of said upper section overlapping the inner surfaces of the jambs when said section is closed, a lower door section, guides on the upper section for receiving the lower section, means for raising the lower section in said guides to overlie the upper section, means actuated by the movement of the lower section as it approaches the upper end of its movement in the guides for moving the upper edges of both sections inwardly to bring the upper edge of the upper section into a position to clear the inner plane of the lintel, means for causing further upward movement of the lower section to move the lower edges of both sections vertically, and other means for causing both sections to swing inwardly during further upward movement of the lower edges of the sections.

10. A pair of door jambs and a lintel, an upper door section between and outside of the inner plane of the jambs and the lintel, plates on the side edges of said upper section overlapping the inner surfaces of the jambs when said section is closed, a lower door section, guides on the upper section for receiving the lower section, means for raising the lower section in said guides to overlie the upper section, means actuated by the movement of the lower section as it approaches the upper end of its movement in the guides for moving the upper edges of both sections inwardly to bring the upper edge of the upper section into a position to clear the inner plane of the lintel, means for causing further upward movement of the lower section to move the lower edges of both sections vertically, other means for causing both sections to swing inwardly during further upward movement of the lower edges of the sections, and means for guiding the upper section between the jambs in closing and for holding the plates against the jambs when the upper section is closed.

11. A pair of door jambs and a lintel, a transverse flange depending from the lintel, an upper door section between and outside of the inner plane of the jambs and the lintel, plates on the side edges of said upper section overlapping the inner surfaces of the jambs, a latch to maintain the upper edge of the upper section against the lintel flange, a lower door section, guides on the upper section for receiving the lower section, means for raising the lower section in said guides to overlie the upper section, rollers near the upper edges of the lower section, inclined channels near the lintel for moving the upper edges of both sections inwardly to bring the upper edge of the upper section into a position to clear the inner plane of the lintel, means for causing further upward movement of the lower section to move the lower edges of both sections vertically, other means for causing both sections to swing inwardly during further upward movement of the lower edges of the sections, means on the lower section for releasing the latch, lugs near the upper corners of the upper section having slanted surfaces for guiding the side edges of the upper section between the jambs in closing, rollers near the lower corners of the upper section and pockets on the jambs for receiving said last-named rollers when the upper section is closed to hold its plates against the jambs.

12. A pair of door jambs, an upper door section between and outside of the inner plane of the jambs, a lower door section, means for raising the lower door section vertically to overlie the upper section, means for causing both sections to swing inwardly to fully open position, and plates on at least one of the door sections overlapping the jambs when said sections are closed.

13. A pair of door jambs and a lintel, an upper door section between and outside of the inner plane of the jambs and a lower door section, means for raising the lower door section vertically to overlie the upper section, means actuated by the movement of the lower door section as it approaches the upper end of its vertical travel for moving the upper edges of both sections inwardly to a position to clear the inner plane of the lintel, means for causing further upward movement of the lower door section to move the lower edges of both sections vertically, other means to cause both sections to swing inwardly during said further upward movement of the lower edges of the sections, and means for guiding the side edges of the upper door section between the jambs in closing.

ARTHUR T. PRESCOTT.